United States Patent [19]

De Waal

[11] Patent Number: 4,989,314
[45] Date of Patent: Feb. 5, 1991

[54] METHOD FOR PREPARING A CORNER PROFILE FIT FOR BUTTING CONNECTION OF CLOSED CHANNELS

[76] Inventor: Casparus W. De Waal, Leembaan 21, 5753 CW Deurne, Netherlands

[21] Appl. No.: 419,711

[22] Filed: Oct. 11, 1989

[51] Int. Cl.⁵ .............................................. B23P 17/00
[52] U.S. Cl. ................................... 29/527.2; 29/458; 156/227; 264/46.6; 264/46.7
[58] Field of Search ...................... 29/450, 458, 527.2, 29/455.1; 264/46.6, 46.7; 156/226, 227

[56] References Cited

U.S. PATENT DOCUMENTS

| | | | |
|---|---|---|---|
| 2,459,120 | 1/1949 | Spraragen | 264/46.7 X |
| 3,439,406 | 4/1969 | Wallin | 29/458 X |
| 3,451,696 | 6/1969 | Hagelin et al. | 264/46.6 X |
| 3,505,436 | 4/1970 | Krug et al. | 264/46.7 X |
| 4,531,335 | 7/1985 | Mangan | 29/450 X |
| 4,628,582 | 12/1986 | Leopold | 29/458 X |
| 4,839,397 | 6/1989 | Lohmar et al. | 264/46.7 X |

FOREIGN PATENT DOCUMENTS 55-41212  3/1980  Japan ........................ 264/46.6

Primary Examiner—Carl E. Hall
Assistant Examiner—Carl J. Arbes
Attorney, Agent, or Firm—Wegner, Cantor, Mueller & Player

[57] ABSTRACT

A profile for the coupling of adjoining channel members comprises a front wall for extending perpendicularly from a wall of the channel member, a back wall extending at least partially parallel to the front wall, a front flange connected to the front wall, a back flange connected to the back wall and a deformable sealing material in the space between the front wall, the back wall and the flanges. The profile is constructed by folding a strip of material along parallel fold lines. A deformable sealing material is applied to the strip, and when the strip is folded, the sealing material is deformed so as to fill a substantial portion of the space between the front wall, the back wall, the front flange and the back flange of the profile.

4 Claims, 2 Drawing Sheets

METHOD FOR PREPARING A CORNER PROFILE FIT FOR BUTTING CONNECTION OF CLOSED CHANNELS

The present invention relates to a method for manufacturing a corner profile for the butting coupling of channels conducting gaseous media, and having a rectangular or square cross section, and which profile comprises a front wall extending perpendicular to the wall of the channel; a back wall extending completely or partially parallel thereto, and two flanges each connected with the front wall or the back wall respectively. Such profiles are used to connect adjoining channel members. The profiles are connected with the four walls of such channel through any fitting connection means, and wherein subsequently hook shaped means are inserted into the corners, which are mutually connected by means of bolts, for example.

The problem with such a connection is to avoid a leak along the profiles or the wall and the hook shaped corner pieces, where cement or cemented strip is often used. The principal locations of leaks are in the corners but also along the flanges which are on both sides against the wall of a part of a channel.

From DE-A-2.221.312 it is already known to apply a layer of cement at the inner side of the profile which encloses the edge of the tunnel wall. This avoids a part of the leaking along the front edge of the channel parts, but not along the hook shaped corner pieces.

The aim of the invention is to alleviate said disadvantage and it provides a method, which distinguished from prior art in that departing from a flat strip, a strip is folded according to parallel lines. The strip is folded such that the front wall and the back wall are parallel, wherein a ridge of flexible material is applied to said strip before this folding process takes place, which ridge has such a shape that said folding process causes a deformation of said ridge.

Such a method ensures that a substantial part of the space between the front wall and the back wall is completely filled with sealing material so that a complete sealing is obtained not only with the insertion of edges of the channel walls but also with the legs of the hook shaped corner pieces.

The ridge of deformable material can be sprayed onto the strip but according to the invention it can also be peeled from a spool as a intermediate product and than applied on the strip. The application can take place by means of temporary gluing means, for instance a gluing strip.

Further the method relates to the corner profile obtained with the method mentioned above, which profile comprises a front wall extending perpendicular to the channel wall, a back wall being completely substantially parallel therewith and two flanges connected with the front wall and the back wall respectively and which has been turned therefrom and which the space bounded by the front wall, the back wall and the flanges contains a strip of sealing material of foamed plastic.

Subsequently the present invention will be illucidated in the following description of the drawings of a preferred embodiment.

DESCRIPTION OF THE PREFERRED EMBODIMENTS

Figure 1A:
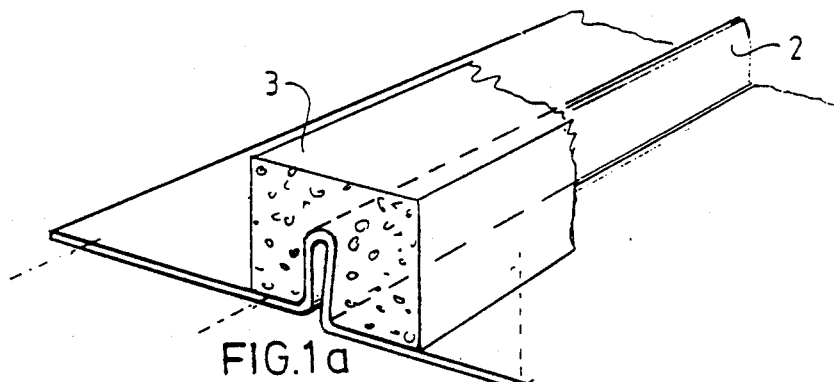
FIG. 1a, b, c show several stages in the preparation of a profile according to the invention departing from a flat strip and comprising a ridge of deformable sealing material; and, FIG. 2 is a perspective view of a butted connection of two channel parts comprising the profile according to FIG. 1.

In FIG. 1a, there is shown a flat strip 1 of material which beforehand has been provided with a folding line 2. The strip of material can have any length and can be peeled from a spool of the material. In the shown embodiment surrounding the folding line 2 a ridge of sealing material 3 is applied, which can take place by spraying or by applying a peeled strip of foamed plastic material for example.

Figure 1B:
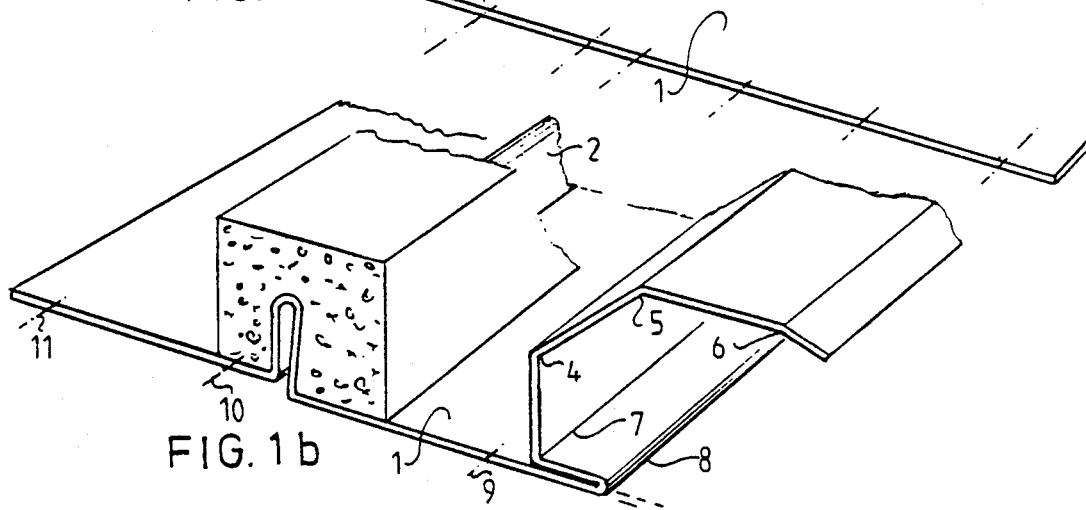

Subsequently the strip 1 can be folded further according to FIG. 1b along in folding lines which are parallel to folding line 2, for instance lines 4, 5 and 6. After the folding along the lines 7 and 8 the intermediate according to FIG. 1b is obtained.

Subsequently line 9, 10, 11 can be folded insulting in the product according to FIG. 1c. It will be clear that in these last folding processes the edge of sealing material 3 is deformed to a substantial triangular shape, and in which the material is biased into the space between the wall is 12 and 13 and the flanges 14 and 15 respectively.

Figure 1C:
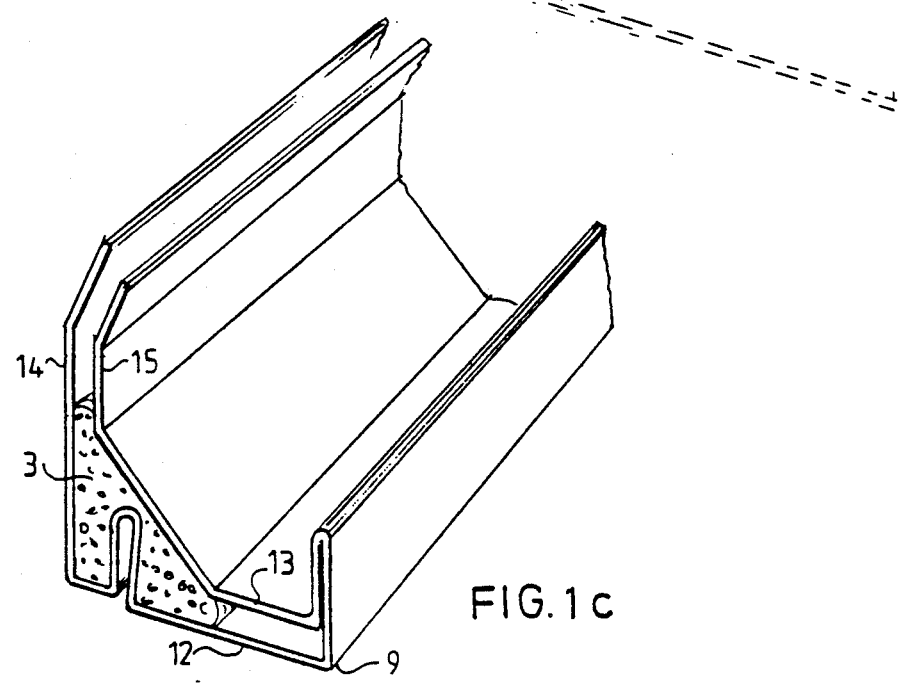
Figure 2:
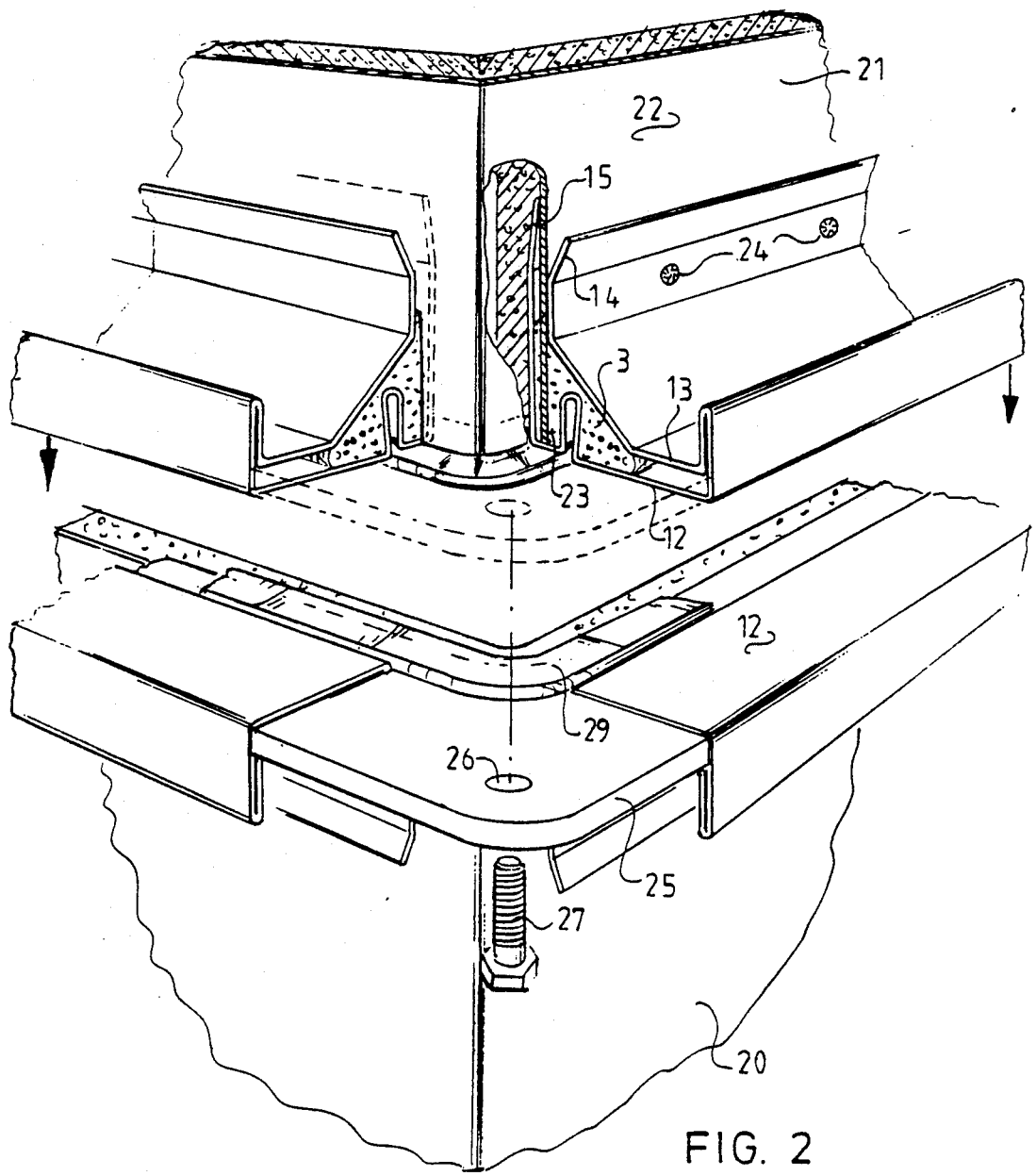

The profile according to FIG. 1c thus obtained can be used in the butting connection of channel parts 20, 21 in FIG. 2. Therefore a profile according to FIG. 1c is conveyed alongside the walls 22 of the channel parts with the flanges 14, 15, wherein the front edge 23 of the wall biased into the foamed plastic material 3. A permanent fixing of the profile on the wall can be obtained by the use of instance local welds 24. The profiles according to FIG. 1c have been previously formed to a frame by means of hook shaped corner pieces 25 comprising a bolt hole 26. Each hook piece 25 comprises a leg which is inserted into the space between the front 12 and back walls 13 of the profile. The inner edge of the leg of the corner piece 25 touches the sealing means 3 in the space between said front and said back walls 12, 13. It is noted that in the left hand side in FIG. 2 the corner piece 25 has been eliminated for reasons of illustration, but should be present as is indicated by the dotted line.

For good sealing a sealing strip 29 is applied against the front wall 12 and the front side of the corner piece 25, so that after the closing of the channel parts 20, 21 against each other by means of the bolt 27 in the bolt holes 26, a permanent connection between the channel parts can be obtained. A gastight seal is insured by the sealing strip 29 alongside the end planes of the connection being formed by the front walls 12 and the front plane of the corner piece 25, and by the sealing material 3. This forms a seal between the flanges 15, 14 and the wall 22 of the channel parts 21 and 20, which avoids possible leaks at the corner piece 25 in the transition between the profiles of FIG. 1c and the corner pieces 25.

Due to the predeformation of the sealing material 3, for example of foam plastic is insured for a longer period of time.

I claim:

1. A method for making a profile for the coupling of adjoining channel members, said adjoining channel members forming a substantially rectangular passage through which a gaseous medium is conveyed, wherein each of said adjoining channel members comprises a channel wall, said profile comprising a first wall for extending perpendicularly from the channel wall of one of the channel members, a second wall extending at least partially parallel to said first wall, a first flange for placement adjacent said channel wall of said one of the channel members, said first flange being connected to an edge of said first wall and extending substantially perpendicularly from said edge of said first wall, and a second flange extending from said second wall, said first flange and said second flange forming a space therebetween for receiving the channel wall of said one of the channel members, said method comprising:

(a) providing a bendable and malleable sheet of profile material, said sheet comprising a first substantially rectangular planar section, a second substantially rectangular planar section, and a fold ridge connecting an edge of each of said first and second rectangular planar sections and projecting from each of said first and second substantially rectangular planar sections, the portion of said sheet corresponding to the first wall being adjacent to the folded ridge;

(b) applying a deformable sealing material to said profile material to surround said folded ridge;

(c) folding said first substantially rectangular planar section along a plurality of fold lines in said first substantially rectangular planar section which are each parallel to said folded ridge to define surfaces of said second wall and said second flange; and (d) folding said first substantially rectangular planar section toward said folded ridge along a fold line in said first substantially rectangular planar section parallel to said folded ridge so that said second wall is at least partially parallel to said first wall, and folding said second substantially rectangular planar section toward said folded ridge along a fold line separating said first flange and said first wall and parallel to said folded ridge so that said first flange extends substantially perpendicular from an edge of said first wall, thereby deforming said sealing material to fill a substantial portion of a space between the first wall, the second wall, the first flange and the second flange.

2. The method according to claim 1, wherein the step of applying a deformable sealing material to said profile material to surround said fold ridge and comprises spraying said deformable sealing material.

3. The method according to claim 1, wherein the step of applying a deformable sealing material to said profile material to surround said folded ridge comprises peeling a strip of said deformable sealing material from a spool and applying the strip to surround said folded ridge.

4. The method according to claim 1, wherein said folded ridge has a substantially U-shaped cross-sectional shape.

* * * * *